(12) United States Patent
Giovannini et al.

(10) Patent No.: US 7,712,297 B1
(45) Date of Patent: May 11, 2010

(54) HAY RAKE WITH FOLDABLE HAY RAKE ARM

(76) Inventors: Adelmo Giovannini, Via Della Rinasclta, 10, Montecastelli di Umbertide, PG (IT) 06010; Michele Tarpanelli, Via Del Popolo, 17, Bastia, PG (IT) 06083

( * ) Notice: Subject to any disclaimer, the term of this patent is extended or adjusted under 35 U.S.C. 154(b) by 0 days.

(21) Appl. No.: 12/417,125

(22) Filed: Apr. 2, 2009

(51) Int. Cl.
*A01D 76/00* (2006.01)
*A01D 78/00* (2006.01)
*A01D 80/00* (2006.01)
*A01D 84/00* (2006.01)

(52) U.S. Cl. .......................................... 56/384; 56/377

(58) Field of Classification Search .................. 56/384, 56/377, 378, 375, 385; 172/632, 315, 318, 172/452
See application file for complete search history.

(56) References Cited

U.S. PATENT DOCUMENTS

| | | | |
|---|---|---|---|
| 3,042,121 A | 7/1962 | Broetzman et al. | |
| 3,484,803 A | 12/1969 | Breed et al. | |
| 3,791,673 A | 2/1974 | Hornung | |
| 3,977,166 A * | 8/1976 | Delgado Delgado | 56/366 |
| 4,231,218 A * | 11/1980 | Delgado | 56/377 |
| 4,974,407 A * | 12/1990 | Rowe et al. | 56/377 |
| 5,263,306 A * | 11/1993 | Tonutti | 56/377 |
| 5,313,772 A | 5/1994 | Tonutti | |
| 5,743,075 A * | 4/1998 | Aron et al. | 56/366 |
| 5,752,375 A | 5/1998 | Tonutti | |
| 5,787,988 A | 8/1998 | Harlan et al. | |
| 5,960,620 A | 10/1999 | Wright et al. | |
| 6,164,683 A * | 12/2000 | Kalman | 280/656 |
| 6,405,517 B1 * | 6/2002 | Peeters et al. | 56/377 |
| 6,813,874 B2 * | 11/2004 | Luchetti | 56/365 |
| 6,892,520 B2 | 5/2005 | Rowse et al. | |
| 7,165,386 B2 * | 1/2007 | Tonutti | 56/375 |
| 7,313,904 B2 | 1/2008 | Hruska | |
| 7,318,312 B2 * | 1/2008 | Cicci et al. | 56/377 |
| 2002/0069634 A1 * | 6/2002 | Tonutti | 56/378 |
| 2003/0233820 A1 * | 12/2003 | Menichetti | 56/377 |
| 2004/0107687 A1 * | 6/2004 | Magnini | 56/377 |
| 2005/0126154 A1 | 6/2005 | Tonutti | |
| 2005/0144925 A1 * | 7/2005 | Rowse et al. | 56/377 |
| 2005/0214105 A1 * | 9/2005 | Steig et al. | 414/723 |
| 2005/0284126 A1 * | 12/2005 | Giovannini | 56/377 |
| 2007/0068134 A1 * | 3/2007 | Cicci et al. | 56/377 |

FOREIGN PATENT DOCUMENTS

JP         2003325004 A    * 11/2003

* cited by examiner

*Primary Examiner*—Árpád Fábián-Kovács
(74) *Attorney, Agent, or Firm*—Coats & Bennett, P.L.L.C.

(57) ABSTRACT

A single action hydraulic cylinder is utilized to rise a rake arm from the operating position to the transport position. An elastic mass is provided between the outer body of the hydraulic cylinder and an adjusting device, such as a nut on the stem of the cylinder. When the cylinder is actuated to rise the rake arm, the stem extends out of the cylinder body, thus freeing the elastic mass from the contact with the cylinder outer body. When lowering the rake arm to its operative position, the stem retracts and the elastic mass comes in contact with the cylinder, thereby acting against the retracting action and limiting the downward movement of the rake arm. The elasticity of the elastic mass permits small vertical movements of the rake arm to accommodate unevenness of the ground.

6 Claims, 4 Drawing Sheets

HAY RAKE WITH FOLDABLE HAY RAKE ARM

BACKGROUND

This invention relates to a device for balancing, holding and releasing a rake arm in a hay rake and, more particularly, relates to a device able to move and balance a rake arm of a hay rake between an operative position (in which the rake arm, provided with a plurality of tine rake wheels, is in a lower position to make the wheels to nearly touch the ground), and a non-operative position (in which the rake arm is in an upper position to permit easy transport and/or storage of the hay rake), to hold said rake arm in said upper position and to release the same arm from this upper position to return to the lower operative position, when needed.

Hay rakes are well known devices utilized in agriculture to aerate cut crops and merge them into windrows of various widths to facilitate the following collection and storage of the crops. Hay rakes typically utilize banks of rotating tined wheels mounted onto rake arms connected to a towed cart. In operation, such rake arms are angled with respect to one another in order to assume a V or a Y form to collect cut crop and form a windrow. Examples of hay rakes are disclosed, for instance, in the following documents: Canadian patent 2515979; Canadian application 2004 2477059; US Patent Application Publications 2002/0069634, 2005/0284126, and 2005/0144925; and in U.S. Pat. No. 7,318,312.

Rake arms can be very long in order to accommodate large banks of wheels and to permit a lesser number of passes to rake a field and hence to save time. However, long rake arms are obviously heavy and cumbersome and require further attention and improvements to avoid inconveniences both in operation and in transport. For example, in operation the rake arms are usually in a generally horizontal position and must be balanced to avoid pushing the tined wheels against the ground. This balancing is usually obtained by means of elastic masses (blocks of rubber or the like, springs, and so on) which support the weight of the rake arms. Vertically operating elastic masses may be utilized, which for a number of reasons are of limited length and hence of limited utility in supporting the rake arms. Above-cited U.S. Pat. No. 7,318,312 utilizes an horizontal spring to avoid the above drawback, acting between the towing cart and a pivoting arm utilized to rise and lower the rake arm. However, this approach requires additional parts to be acquired, stored, and mounted with attendant costs.

Thus, while various rake arm approaches have been proposed, they have not proven satisfactory for all situations. Accordingly, there remains a need for alternative rake arm approaches.

SUMMARY

In one embodiment, a single action hydraulic cylinder is utilized to rise the rake arm from the operating position to the transport position. An elastic mass is provided that acts between the outer body of the hydraulic cylinder and an adjusting device, such as a nut on the stem of the cylinder. This stem acts on an extremity of a folding arm, attached to the rake arm, rotatable about an axis offset with respect to the attachment point of the stem to the folding arm. This causes the folding arm to rotate about the axis as the stem of the hydraulic cylinder is moved between a retracted position to an extended one, and vice-versa. When the cylinder is actuated to rise the rake arm, its stem is extended out of the cylinder body, thus freeing the elastic mass from the contact with the cylinder outer body. When lowering the rake arm to its operative position, the stem is retracted and the elastic mass come in contact with the cylinder, thus acting against the retracting action and thereby limiting the downward movement of the rake arm. Moreover, the elasticity of the elastic mass permits small vertical movements of the rake arm, thus allowing the rake arm to accommodate its position according to the unevenness of the ground.

During the upwards movement of the folding arm, and of the attached rake arm, an extension of the same may come in contact with a second elastic mass, compressing the second elastic mass under the action of said single action hydraulic cylinder. At the end of its upwards movement the folding arm engages a retaining device (e.g., latch), thus remaining in its raised position, even if the hydraulic cylinder is deactivated. When the folding arm, and attached rake arm, is to be brought back to its lower position, the retaining device is deactivated thus freeing the folding arm to move under the influence of the second elastic mass, which, as it decompresses, pushes the folding arm to start a downwards movement. The downward movement is duly controlled by the inertia of the hydraulic cylinder.

The various aspects of the illustrative embodiments of the invention may be used alone or in any combination, as is desired.

DETAILED DESCRIPTION

Figure 1:
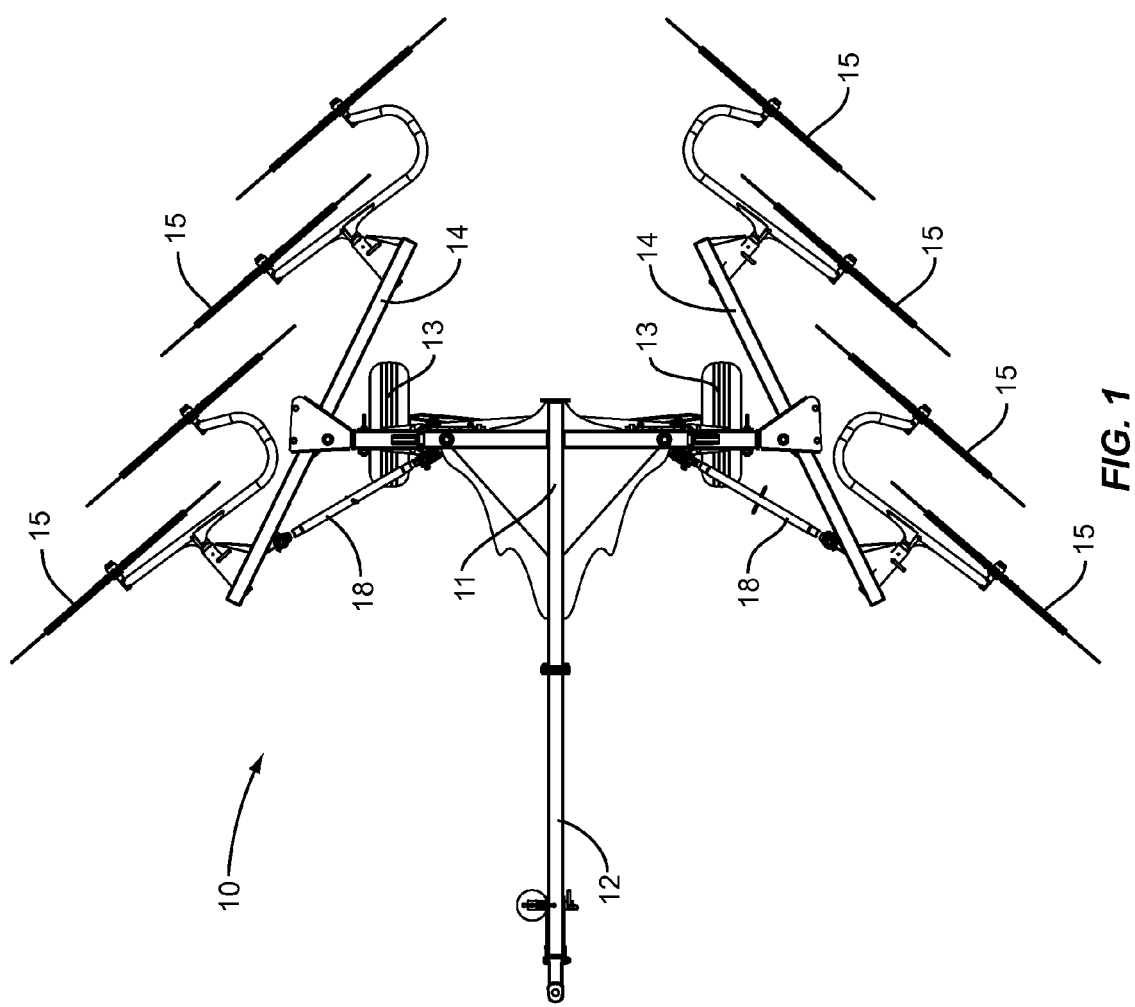
FIG. 1 shows a top view of a hay rake according to one embodiment of the present invention, with the folding arms deployed.
Figure 2:
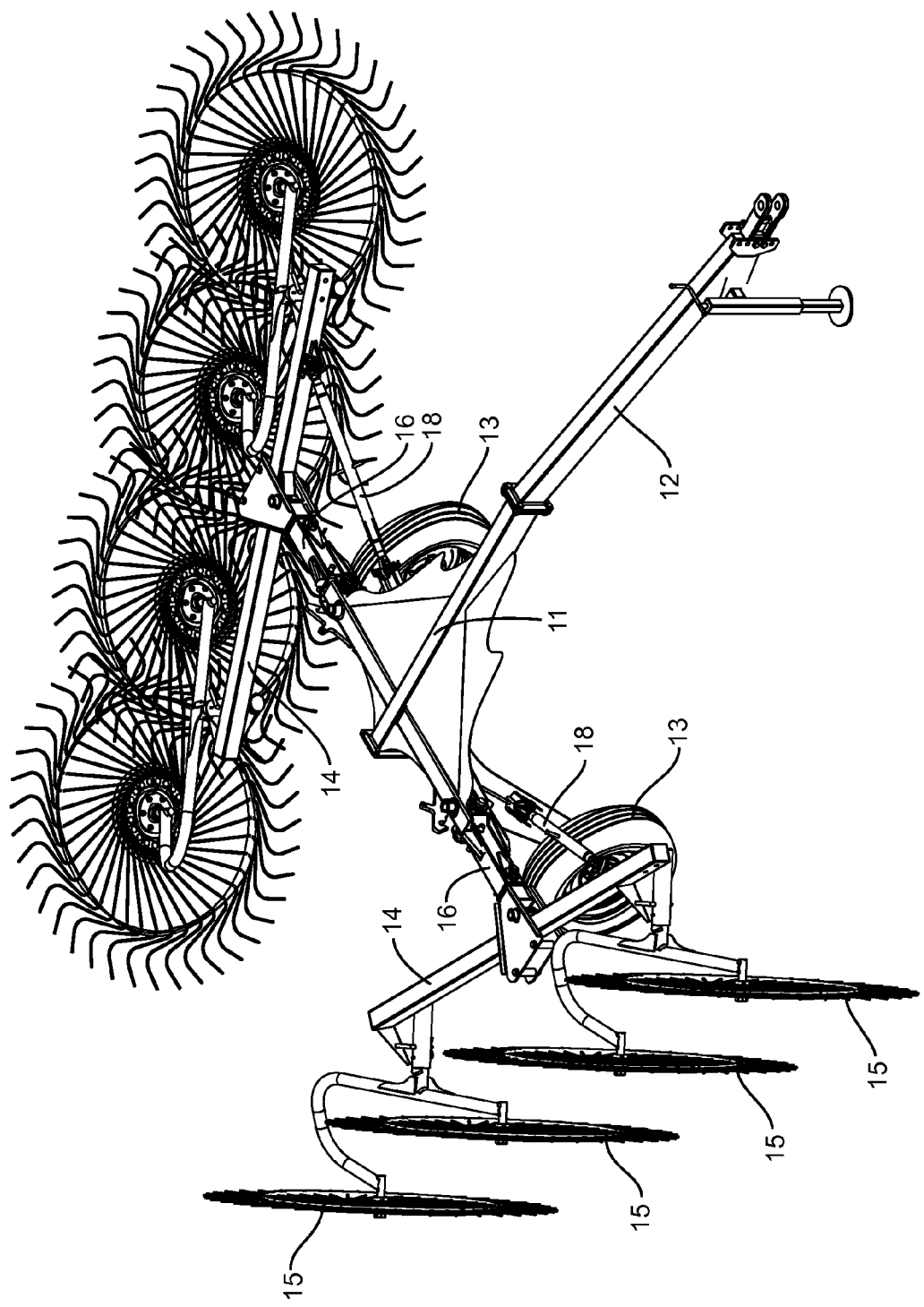
FIG. 2 shows a perspective view of the hay rake of FIG. 1.

With reference to FIGS. 1 and 2, a hay rake, generally indicated at 10, is shown. The hay rake 10 includes a wheel chart 11 provided with wheels 13, a towing bar 12, lateral opposite wings 11' and 11", rake arms 14 provided with tine rake wheels 15, folding arms 16 rotatable around pin 26 and bearing said rake arms, positioning arms 18 to rotate rake arms when in lower operative position and obtain the desired width of the windrow.

When the folding arms 16 and attached rake arms 14 are in the upper, or transport, position, said positioning arms 18 can be utilized, in a known manner, also to support the weight of arms 14 and to prevent undesired movements of the same. However, other means can be utilized having the same functions of positioning arms 18.

Figure 3:
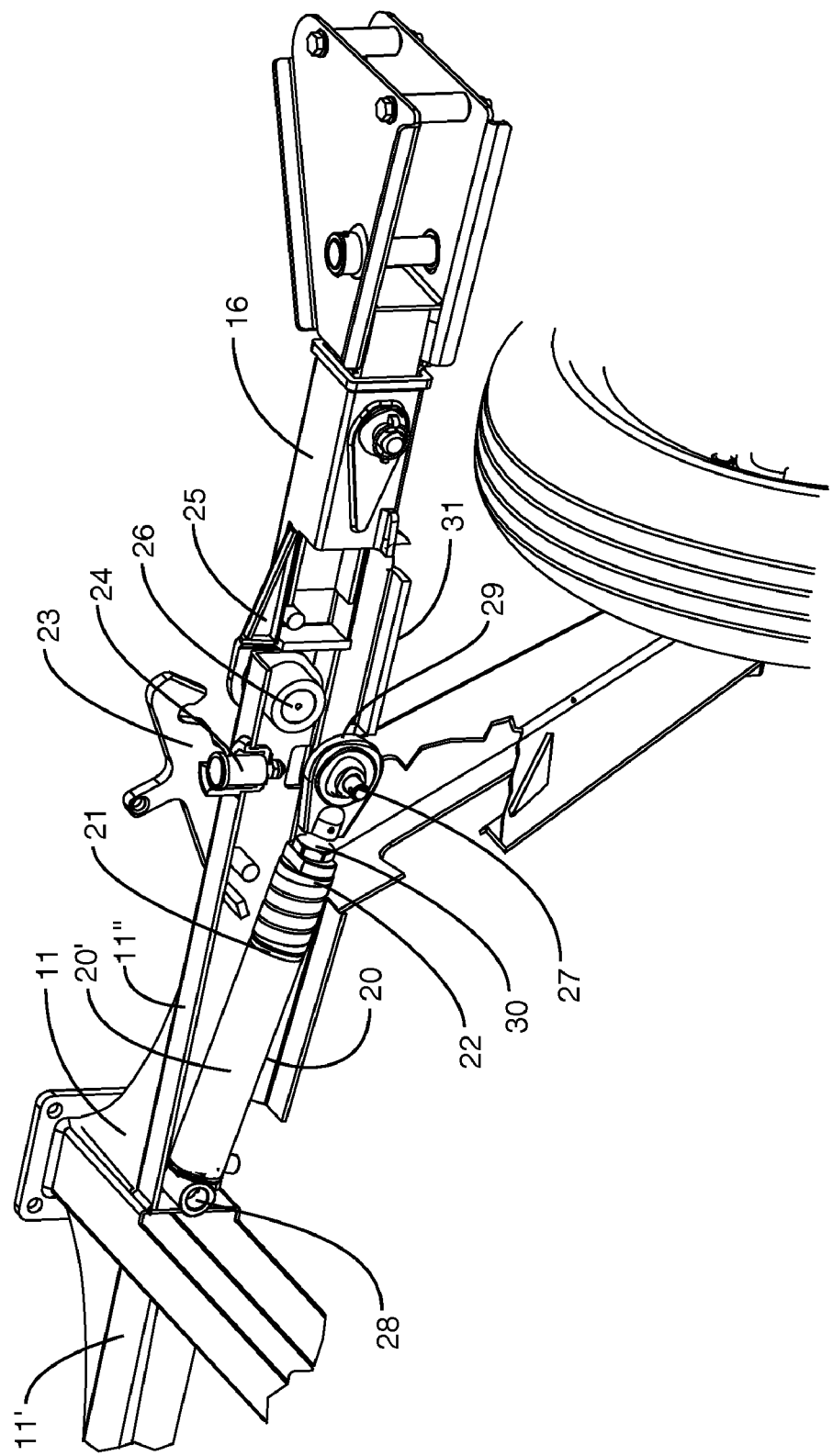
FIG. 3 shows the hay rake of FIG. 1, with the folding arm in the lower position and the rakes and rake arms removed for clarity.
Figure 4:
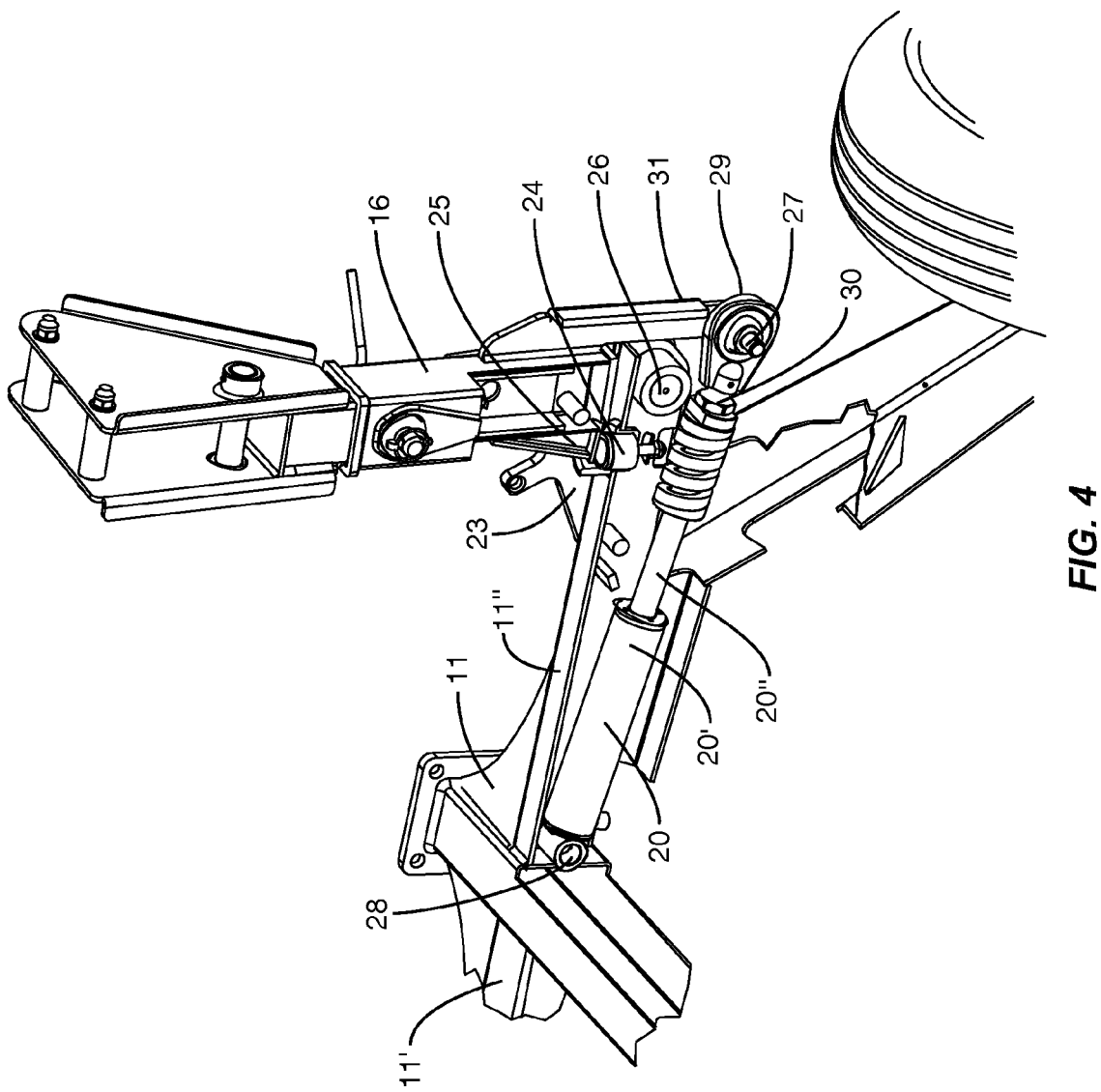
FIG. 4 shows the hay rake of FIG. 1, with the folding arm in the upper position and the rakes and rake arms removed for clarity.

FIGS. 3 and 4 show a single-action hydraulic cylinder 20 connected at point 28 to left wing 11" of cart 11, said cylinder 20 comprising an outer body 20' and a stem 20" provided at its distal end with a head 29 connected by means of a pin 27 to a lower part 31 of folding arm 16, a threaded part (not shown) and a nut 30 engaged with said threaded part to be rotatably moveable along it. Around stem 20" an elastic mass 21 is placed, in this figures embodied by a spring. When the folding arm is in its lower position, the spring 21 is compressed between an extremity of outer body 20' and nut 30; the so compressed elastic mass 21 thus contrasting the weight of rake arm 14 as well as the action of the stem 20" to further retract into outer body 20' thus preventing folding arms 16 to continue its downwards movement. Movement of nut 30 along threaded part (not shown) of stem 20" will regulate compression of elastic mass 21 and hence its reaction to weight of rake arm 14, thus permitting the rake wheels to just "skip" the ground.

When it is needed to rise the folding arms 16, hydraulic cylinder 20 is activated, stem 20" extends out of outer body 20' pushing the lower extremity 31 of folding arm 16 to rotate around pin 26, advantageously offset with respect to pin 27. When in its rotation folding arm 16 reaches a position at right angle with wing 11", or just past it, an extension 25 of arm 16 comes in contact with a second elastic mass 24 housed into wing 11", and compresses it. At the same time a retaining device 23 engages extension 25, maintaining it in this position, even if action of hydraulic cylinder is ceased. The second elastic mass can be a spring, a rubber block or the like.

When needed, it is sufficient to release retaining device 23 to allow the second elastic mass 24 to uncompress, pushing the folding arm 16 to start a descent, moderated by the inertia of hydraulic cylinder 20, to the lower, operative position of rake arms 14.

Of course, all the above description also applies to the right wing 11' of the hay rake. Moreover, the right and left sides of the hay rake according to present invention can be activated separately, permitting to utilize if needed only the necessary side of the rake.

From the above description it is apparent that the device according to present invention is extremely simple and effective, permitting to operate a hay rake without unduly weight additions, and costs.

The present invention may, of course, be carried out in other specific ways than those herein set forth without departing from the scope of the invention. The present embodiments are, therefore, to be considered in all respects as illustrative and not restrictive, and all changes coming within the meaning and equivalency range of the appended claims are intended to be embraced therein.

What is claimed is:

1. A hay rake, comprising:
   a wheeled cart provided with wheels and a towing bar;
   lateral opposite wings and folding arms rotatably supported by the cart;
   rake arms provided with rake wheels connected to the folding arms;
   positioning arms operative to rotate the rake arms in a generally horizontal plane when in a lower operative position to obtain a windrow of desired width;
   wherein each lateral opposite wing supports a single action hydraulic cylinder comprising an outer body and a slidably moveable stem protruding from the outer body;
   the stem being provided at its distal end with a head connected by a pin to a lower part of the corresponding folding arm and with a threaded part;
   a nut being rotatably moveable along the threaded part;
   a first elastic mass disposed between the nut and the outer body; the nut being moved along the threaded part to control a compression level of the first elastic mass;
   a second elastic mass and a retaining device for the folding arm are placed on each of the lateral opposite wing;
   the single action hydraulic cylinder when activated causes the stem to slide out of the outer body thereby causing the folding arm to rotate around the pin from a first generally horizontal working position to a second generally vertical position, and causing the folding arm to compress the second elastic mass and be engaged by the retaining device to be blocked in the first position.

2. A device according to claim 1 wherein the retaining device is movable to allow the second elastic mass to push the folding arm out of the second position.

3. A device according to claim 1 wherein the second elastic mass is a spring.

4. A device according to claim 1 wherein the second elastic mass is a rubber block.

5. A device according to claim 1 wherein the retaining devices mounted on the lateral opposite wings can be operated independently from each other.

6. A device according to claim 1 wherein the first elastic mass is a spring.

* * * * *